US006881003B1

(12) United States Patent
Zeller et al.

(10) Patent No.: US 6,881,003 B1
(45) Date of Patent: Apr. 19, 2005

(54) LATCHING MECHANISM FOR HIGH MAST LIGHTING SYSTEM

(75) Inventors: Robert Dale Zeller, Newark, OH (US); Bonnie J. Brohard, Granville, OH (US); William Walter Belisle, Newark, OH (US); Jackie Everett Pletcher, Zanesville, OH (US)

(73) Assignee: Acuity Brands, Inc., Atlanta, GA (US)

( * ) Notice: Subject to any disclaimer, the term of this patent is extended or adjusted under 35 U.S.C. 154(b) by 0 days.

(21) Appl. No.: 10/465,430

(22) Filed: Jun. 18, 2003

(51) Int. Cl.[7] .................................................. F16B 1/100
(52) U.S. Cl. ....................................... 403/348; 403/122
(58) Field of Search ................................ 403/348, 349, 403/122, 135

(56) References Cited

U.S. PATENT DOCUMENTS 4,394,101 A * 7/1983 Richer ......................... 410/83
6,679,646 B1 * 1/2004 Quardt et al. ............... 403/348

* cited by examiner

*Primary Examiner*—John R. Cottingham
(74) *Attorney, Agent, or Firm*—Kenneth E. Darnell

(57) ABSTRACT

A latching mechanism useful in the raising and lowering of luminaires mounted to a support ring and positionable at an upper end of a high mast, the invention comprehends a latch pin capable of articulating attachment to the support ring for preventing damage to latching structure and for reducing the potential for jamming as the latch pin engages latch cams on raising of the support ring. The latch pin is particularly configured with a ball-shaped swivel joint capable of reducing the potential for damage to the pin and associated structure by permitting the support ring to tilt if canted during a lowering operation. The latch pin is further configured with a nose portion of a diameter sufficient to center the latch pin relative to latch cams on raising of the support ring, thereby to reduce the potential for jamming.

32 Claims, 4 Drawing Sheets

PRIOR
ART

PRIOR
ART

LATCHING MECHANISM FOR HIGH MAST LIGHTING SYSTEM

BACKGROUND OF THE INVENTION

1. Field of the Invention

The invention relates generally to mechanisms employed to raise and lower groupings of luminaires mounted to a support ring and positionable at a distal end of a high mast such as is useful for illumination of a roadway or the like, the invention particularly relating to a latching mechanism and a latch pin forming a portion thereof and which functions to minimize the potential for damage to the pin and mechanism and to reduce the potential for jamming of the mechanism.

2. Description of the Prior Art

Clusters of luminaires intended for outdoor illumination have long been mounted to support rings for hoisting of the resulting luminaire and support ring assembly to or near the top of a high mast, typically through use of a winch and hoisting cables, the assembly being necessarily lowered subsequently for maintenance, repair or even replacement of the luminaires. In accomplishing these functions, the support ring carrying the luminaires must be mounted for movement along the mast between a lowermost position necessary for servicing and the like and an operational uppermost position at or near the top of the mast at which the luminaire-bearing support ring is latched to a support permanently located at an upper portion of the mast. Latching mechanisms are typically employed for positively holding the support ring to the support at the uppermost position, a first portion of the latching mechanism being typically carried by the support ring with a second portion of said latching mechanism being carried by the support and mateable with said first portion of the latching mechanism to mutually and automatically engage on completion of a hoisting operation and to releasably latch the support ring to the stationary support. When desired, the latching mechanism must be capable of disengagement to allow the luminaire-bearing support ring to be lowered back to the ground, that is, the lowermost position.

Prior systems employed for providing the functions thus described vary in structure and operation as will be discussed hereinafter, certain of these prior systems having disadvantages and limitations resulting in jamming of latch pins and latch cams during the raising of a luminaire-bearing assembly, such jamming having the potential to occur as at least certain prior art latch pins enter at least certain prior art latch cams. The jamming of such latch pins and latch cams prevents secure engagement between a support ring bearing luminaires and an essentially stationary support mounted to a mast at or near an upper end thereof. Such a malfunction is difficult to correct in light of the fact that the jammed latching mechanism is located at a distance above ground level inconvenient for correction of the difficulty. Further, latch pins configured according to at least certain prior art designs can be bent and thus damaged during lowering of a luminaire-bearing support ring if the support ring tilts relative to the mast, such a condition being usually caused by the hanging up of the support ring on a single pin to the stationary support located at the top of a mast. Such a condition is not only difficult to correct, it usually results in damage to at least one of the prior art latch pins, thereby necessitating replacement of one or more of the latch pins with an attendant cost of labor and materials.

The art is replete with systems proposed for use and actually used for the raising and lower of luminaire assemblies relative to high mast poles, such systems being intended at least in part to address deficiencies existing in the art such as are alluded to hereinabove. Typical prior art systems include that system described by Murray et al in U.S. Pat. No. 4,234,165, in which hoist cables and a winch cable are secured to a transition plate located inside a pole by rotatable ball bearing devices intended to prevent twisting of said cables during raising and lowering operations. Luminaires are raised and lowered according to the teachings of Garchinsky in U.S. Pat. No. 4,228,488 by means of a floating linkage intended to compensate for differences in cable length, latching structure being also provided for removing loading from cables on engagement of a luminaire-bearing carrier ring with a support mounted at an upper end of a high mast. Latimer, in U.S. Pat. No. 5,975,726, discloses a high mast lighting system having a latch member adapted to latch a luminaire-bearing ring to a stationary structure disposed at an upper end of a mast on raising of the ring and to release said ring from the stationary structure to permit lowering of the ring. Blahut, in U.S. Pat. No. 4,115,845, discloses latching mechanisms intended to permit raising and lowering of a cluster of luminaires relative to a mast. In U.S. Pat. No. 4,237,530, Murray et al disclose a locking and support mechanism intended to support a platform carrying luminaires independently of cable operable for raising and lowering said luminaires. Garchinsky, in U.S. Pat. Nos. 4,149,230 and 4,429,355, further describes raising and lowering devices for luminaire assemblies mountable to high masts. In U.S. Pat. No. 3,801,813, Kichn describes a system for hoisting an assembly of luminaires to an operative position atop a high mast as does Richter in U.S. Pat. No. 6,261,122 and Thompson in U.S. Pat. No. 4,139,884. Butterworth in U.S. Pat. No. 5,570,546 describes a system having similar hoisting capabilities for raising and lowering communication equipment on a high mast. Zeller, in U.S. Pat. Nos. 3,721,816 and 3,847,333, discloses methods and apparatus for positioning a support ring carrying a cluster of luminaires on a high mast, the support ring being movable along the mast. Pletcher et al, in U.S. Pat. No. 4,198,022, disclose method and apparatus for displacing a luminaire-bearing support along a high mast.

While systems used in the prior art exhibit in a number of configurations an ability to provide useful functions, the art has experienced a long-felt need for a system particularly resistant to jamming on raising of a luminaire-bearing support to an operational position atop a high mast and further resistant to damage to latching structure on disengagement of such a support to lower said support for service. The present invention therefore intends the provision of a latch mechanism and particularly an improved latch pin capable of an articulating attachment to a luminaire-hearing support ring so that damage to the pin is prevented in the event of improper operation of a lowering device. Further, the present latch pin is capable of providing a centering function to prevent misalignment of said pin relative to cam latch structure carried on a stationary mount disposed atop a high mast, thereby preventing jamming between the pin and cam latch structure. The present latch mechanism thus addresses needs existing in at least certain prior art systems by providing inter alia an improved and reliable latch pin that further permits economies of cost in the construction of a system used in environments within which the invention is intended to function.

SUMMARY OF THE INVENTION

The invention provides an improved latch mechanism useful in systems employed in the raising and lowering of clusters of luminaires between an operational position atop a high mast and a service position usually at ground level. The invention particularly provides an improved latch pin configured to permit an articulating attachment of the pin to a luminaire-bearing support ring, articulation being provided by a ball joint disposed at a lower end of the pin for the purpose of minimizing possible damage to the pin and associated structure as a result of improper operation of a hoist system during lowering of the support ring. When lowering a luminaire-bearing support ring from an operational position atop a high mast, one of a plurality of latch mechanisms can fail to disengage thereby causing the support ring to tilt and potentially cause damage to a latch pin and associated structure of the fouled latch mechanism. The ability of the present latch pin to pivot by virtue of the provision of the ball joint at one end thereof minimizes the potential for the pin to bend and thus be damaged under such conditions. The present pin thus allows the support ring to hang on a single pin in the event of fouling during the lowering procedure, the ring being capable of tilting or canting on the mast without damage to the latch pin or to elements of the support ring.

The improved latch pin of the invention is provided at the end opposite the ball joint with a nose structure that has an increased diameter relative to prior latch pin structures and to remaining central body portions of the latch pin, the enlarged diameter nose acting to center the latch pin relative to pin receiving structure carried by a typically stationary support mounted to an upper end of the mast. The nose of the present latch pin acts to kick the pin toward the center of the pin receiving structure, typically refered to as a latch barrel, during latching of the luminaire-bearing support ring to the stationary support as the support ring is raised into engagement with the stationary support. The potential for jamming during the latching procedure is thereby reduced by virtue of the centering function provided by the enlarged diameter of the nose of the present latch pin as the latch pin enters the latch barrel. Misalignment of the latch pin with the latch barrel is prevented through configuration of the nose of the latch pin with dimensions permitting improved function during the latching procedure.

Accordingly, it is an object of the invention to provide an improved latch mechanism and particularly an improved latch pin for a high mast hoist system and which is capable of preventing damage to the pin and associated structure in the event of fouling during lowering procedures and which is further capable of reducing the potential for jamming of the latch mechanisms as a luminaire-bearing support ring and a stationary support mounted atop a high mast are engaged during raising procedures.

It is another object of the invention to provide an improved latch mechanism and particularly an improved latch pin for a high mast hoist system and particularly a system useful for displacing a luminaire-bearing support ring along a high mast for engagement with and release from a stationary support mounted atop the mast, the improved pin having a ball joint formed at a lower end to provide an articulating attachment of said pin to the support ring for preventing damage to the pin and to associated structure such as structure of or carried by the support ring in the event of fouling during lowering of the support ring when only inadvertently partially released from the stationary support.

It is a further object of the invention to provide an improved latch mechanism and particularly an improved latch pin for a high mast hoist system and particularly a system for displacing a luminaire-bearing support ring along a high mast for engagement with and release from a stationary support mounted atop the mast, the improved pin having an enlarged nose portion functioning to center the pin relative to receiving structure carried by the stationary support and thus to prevent misalignment therebetween and thus jamming when the support ring engages the stationary support for latching during raising procedures.

Further objects and advantages will become more readily apparent in light of the following detailed description of the preferred embodiments of the invention.

DESCRIPTION OF THE PREFERRED EMBODIMENTS

Figure 1A:
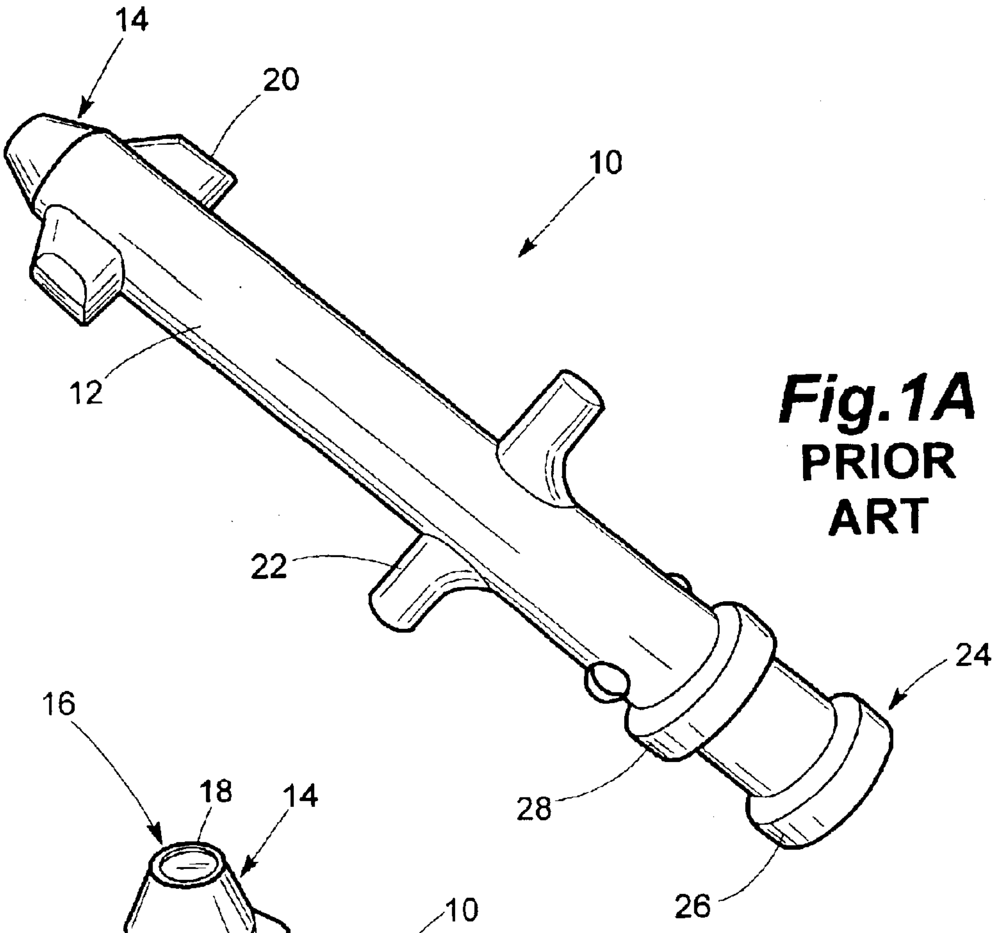
FIGS. 1A and 1B are perspective views of a prior art latch pin over which the present invention intends improvement.
Figure 1B:
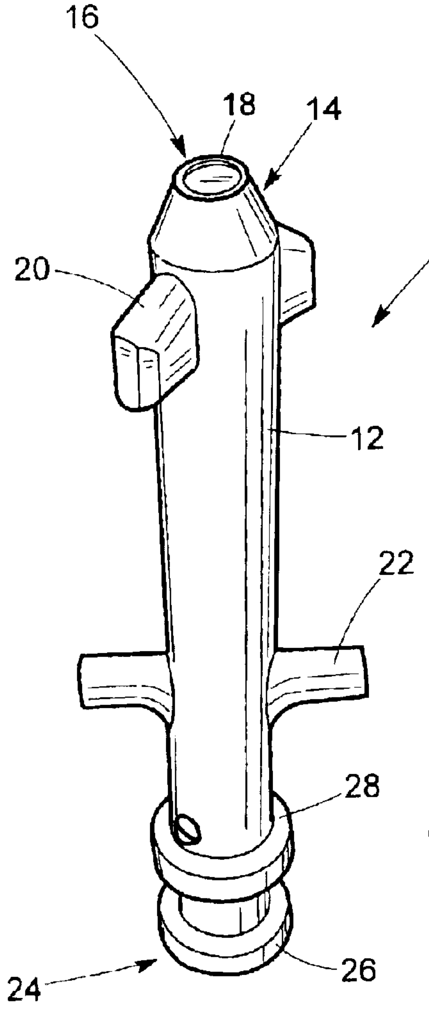
Figure 2:
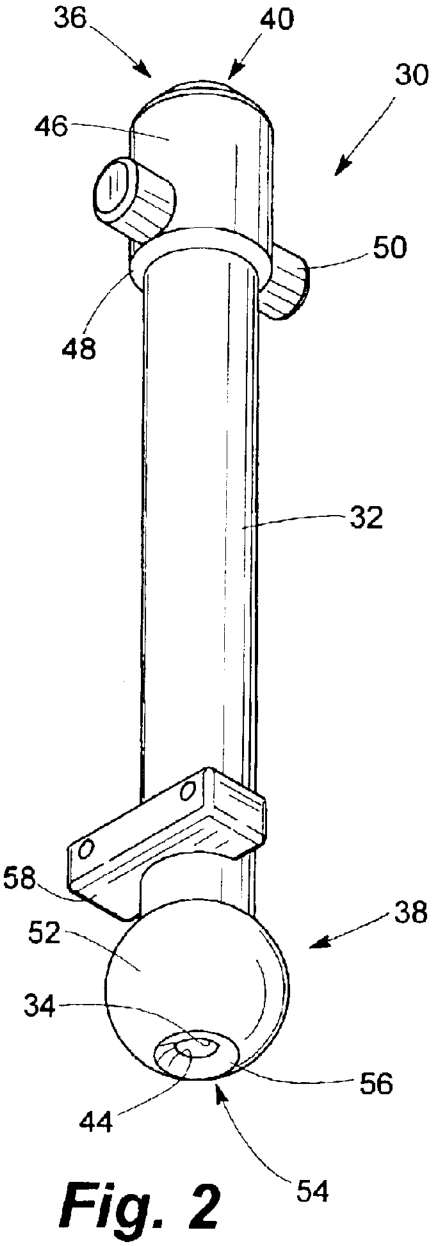
FIG. 2 is a perspective view of the improved latch pin of the invention.
Figure 3:
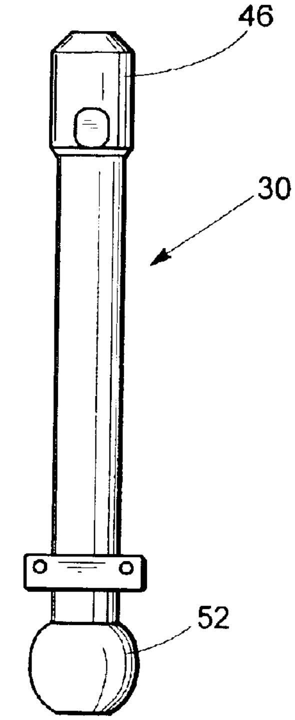
FIG. 3 is a side elevational view of the latch pin of FIG. 2.
Figure 4:
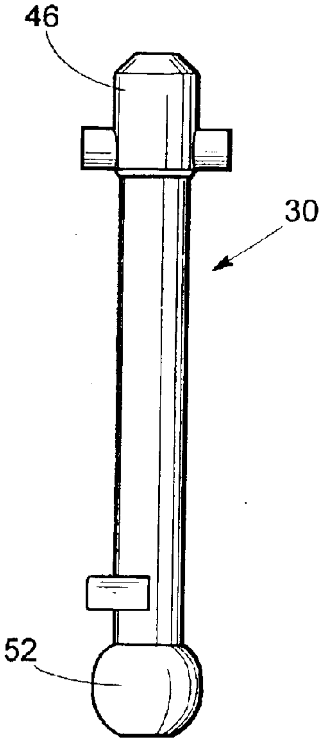
FIG. 4 is a side elevational view of the latch pin of FIG. 2 rotated ninety degrees from the view of FIG. 3.
Figure 5:
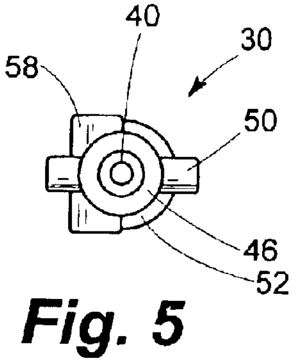
FIG. 5 is a plan view of the latch pin.
Figure 6:
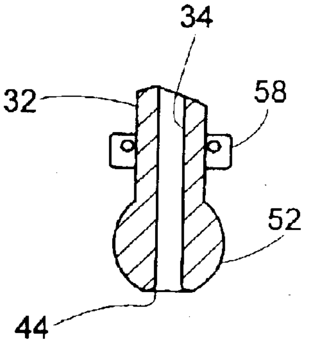
FIG. 6 is a detail view of the latch pin in section taken through lines 6—6 of FIG. 4.

Referring now to the drawings and particularly to FIGS. 1A and 1B, a prior art latch pin is seen generally at 10 to have a substantially cylindrical and elongated body 12 with one end at 14 formed essentially in the shape of a frustrum of a cone, said end 14 being open at 16 to communicate with a lengthwise channel 18 disposed throughout the length of the body 12. The channel 18 permits receipt of a hoist cable (not shown) through the pin 10 as is conventional in the art. The end 14 of the pin 10 is disposed upwardly when in use, said end 14 having wing-like extensions 20 disposed immediately below said end 14 with elongated extensions 22 being disposed in spaced relation to the extensions 20 further along the body 12 essentially centrally of said body 12. The extensions 20 function to engage cams (not shown) forming a part of a prior art latch mechanism and bear against the cams to take loading from cables used to raise and lower a support ring (not shown) on which the latch pin 10 is mounted. The extensions 22 facilitate rotation of the latch pin 10 during release of said pin 10 for engagement with the cams alluded to above. The putative plane in which the extensions 20 lie is disposed at an angle of approximately 45° to the putative plane in which the extensions 22 lie. Two spaced annular flanges 26 and 28 are formed on the pin 10 at end 24 opposite the end 14, the flange 26 being disposed directly at the end 24 with the flange 28 being located inwardly of the flange 26, the flanges 26, 28 acting to mount the pin 10 to a support ring (not shown) in a conventional manner, such a support ring typically mounting a plurality of luminaires (not shown). The prior art pin 10 engages and is capable of latching to and releasing from prior art pin-receiving structure (not shown) carried by a stationary support (not shown) mounted atop a high mast (not shown) in a known system as is used to displace such a support ring along a mast. The prior art latch pin 10 in use requires two cams in associated structure for full operation, the extensions 20 and 22 being functional relative to two different cams. In operation, the extensions 22 act to cock the latch pin 10 through a 45° angle, the extensions 20 then sliding down its associated cam to seat. During a lowering operation, the latch pin 10 is raised such that a different cam acts to cock the pin 10 through an angle of 45° to disengage said pin 10. The present invention intends improvement over prior latch mechanisms and prior latch pins such as the prior art latch pin 10 of FIGS. 1A and 1B.

The disclosures of U.S. Pat. Nos. 3,721,816; 3,801,813; 3,847,333; 4,115,845; 4,139,884; 4,149,230; 4,198,022; 4,228,488; 4,234,165; 4,237,530; 4,429,355; 5,570,546; 5,975,726 and 6,261,122 are incorporated hereinto by reference.

While the disclosure herein provided references the invention as being particularly useful in a system intended to deploy luminaires atop a high mast for illumination of areas and typically outdoor areas, it is to be understood that the invention can be employed in systems other than high mast lighting systems without departing from the inventive intent apparent from the disclosure so provided.

Referring now to FIGS. 2 through 6 in particular, an improved latch pin configured according to the invention is seen at 30 to have an elongated, substantially cylindrical body 32 formed with a channel 34 extending throughout said body 32, the pin 30 being open at respective ends 36 and 38, the end 36 is the "top" end of the pin 30 in a use orientation, the end 38 therefore being the "lower" end. The pin 30 is formed of steel or other suitable material as is conventional in the art. The end 36 of the latch pin 30 is shaped as a frustum of a cone and has a central opening 40 communicating with the channel 34. The channel 34 receives in a conventional manner a hoist cable 42 seen best in FIG. 7, the cable 42 extending through the opening 40, the channel 34 and then through opening 44 formed in the lower end 38 of the latch pin 30. The body 32 of the latch pin 30 is enlarged in diameter at the top end 36 to form a nose 46, the nose 46 being preferably formed integrally with the body 32 even though appearing to form a sleeve over the top end 36 inwardly of the frusto-conical portion of said end 36. The nose 46 is preferably formed with a chamfer at 48. Pin extensions 50 extend one each from opposite faces of the nose 46, the pin extensions 50 preferably being oval-shaped in cross-section. It is to be understood that the pin extensions 50 can be otherwise shaped, such as with a circular cross-section, and are dimensioned to function in association with structure to be described hereinafter for a latching function.

A ball joint 52 is formed on the lower end 38 of the latch pin 30, the ball joint 52 being essentially spherical in conformation. An outer portion of the ball joint 52 at 54 is removed and a depression 56 is formed in the ball joint 52. The opening 44 is centrally located within the depression 56. A block 58 is formed in the body 32 inwardly of the ball joint 52 and serves to mount a flag 92 (seen in FIGS. 7 and 9) used to visually check the latched condition of the pin 30. The block 58 is shaped as a rectangular solid and has a lengthwise axis that is essentially perpendicular to a longitudinal axis taken through the pin extensions 50.

Figure 7:
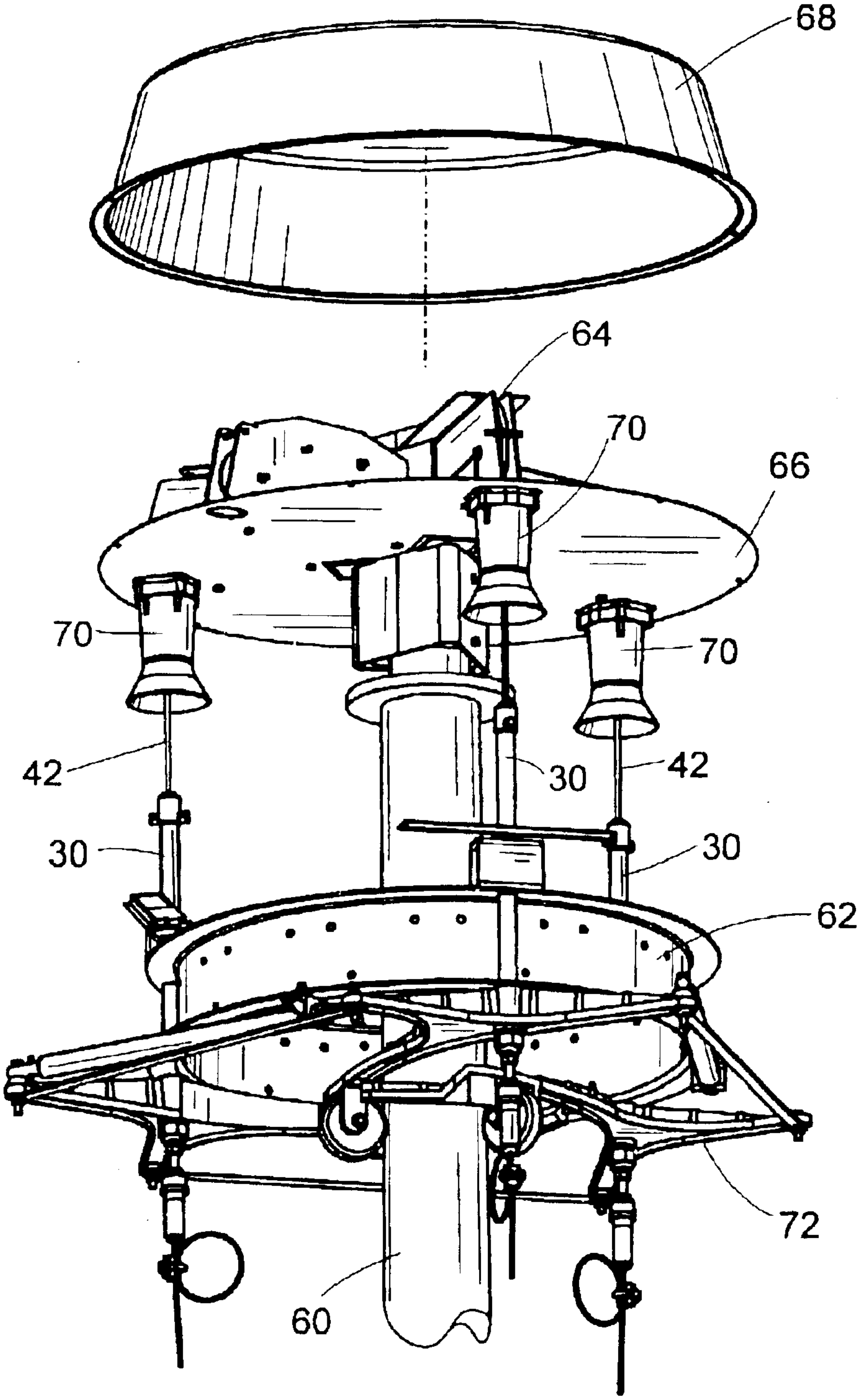
FIG. 7 is a perspective view partially exploded of a support ring on which the improved pin is carried shown in spaced relation to a stationary support mounted atop a high mast.

Referring now to FIG. 7 inter alia, a mast 60 of conventional configuration is seen to conventionally mount a support ring 62 for displacement along said mast 60 by means of a substantially conventional cable arrangement embodied in the cable 42 as well as two other identical cables operated by a conventional winch (not shown), the cables 42 extending through the interior of the mast 60 to respective reels 64 located on a stationary support plate 66 permanently mounted atop the mast 60. The plate 66 of that structure conventionally mounted thereon is preferably enclosed by a head frame cover 68 seen in FIG. 7 to be spaced from the support plate 66 for purposes of illustration. Preferably, a series of three latch barrels 70 are mounted to an underside of the support plate 66 at regularly spaced intervals about the outer periphery of said plate 66. The latch barrels 70 are configured essentially as are those latching barrel structures disclosed in U.S. Pat. No. 3,721,816, the disclosure of which is incorporated hereinto by reference as indicated above. One each of the hoist cables 42 extend centrally through each one of the latch barrels 70 and subsequently through the channel 34 of each one of three latch pins 30 mounted to the support ring 62 in a manner to be described hereinafter. The support ring 62 mounts a plurality of luminaires that are not shown in the drawings for ease of illustration. Structure shown in FIG. 7 as being associated with the support ring 62 such as iris arms 72 are conventional and need not be described herein since such structure is not related to the structure and function of latch mechanisms formed of the latch pins 30 and the latch barrels 70 as are the subject of the present invention. The position of the support ring 62 in FIG. 7 could be that position assumed by the support ring 62 either during raising of said ring 62 before engagement with the support plate 66 or during lowering of the support ring 62 after disengagement from the support plate 66.

Figure 8:
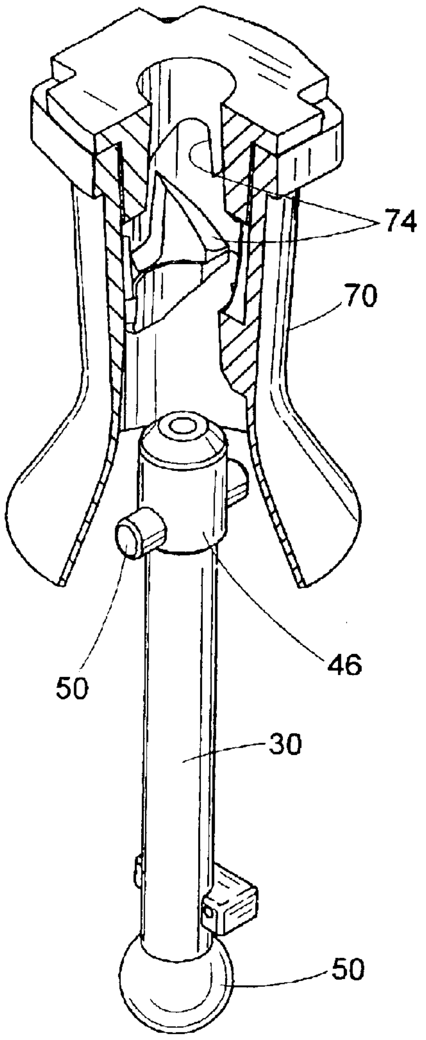
FIG. 8 is an idealized perspective view of the improved latch pin shown in spaced relation to a pin-receiving latch barrel shown partially cut away; and, FIG. 9 is a detail perspective view of the improved latch pin and structure mounting the pin to the support ring.

With reference now also to FIG. 8, one of the latch pins 30 seen in FIG. 7 is seen to enter the corresponding latch barrel 70, the hoist cable 42 as well as other structure being removed for ease of illustration. As is clear from a viewing of FIG. 8, the top end 36 of the latching pin 30 is seen to move into an open lower portion of the latch barrel 70 so that the pin extensions 50 can engage surfaces of cams 74, the cams 74 being shaped as aforesaid to cause the latch pin 30 to rotate approximately 45 degrees as the pin 30 continues movement into the latch barrel 70 under tension from the support afforded by the hoist cable 42. Once the support ring 62 has reached an engaged relation with the support plate 66, a winch (not shown) operating the cables 42 reverses and the support ring 62 and thus the latch pins 30 drop downwardly a distance sufficient to cause an additional rotation allowing each latch pin 30 to catch on inside cam surfaces of each of the latch barrels 70, thereby removing loading on the winch (not shown) and on the hoist cables 42. As noted herein, the structure of the latch barrels 70 and of the cams 74 are shown in U.S. Pat. No. 3,721,816, that structure being essentially conventional. The latch pins 30 thus latch to the latch barrels 70 to releasably mount the support ring 62 to the support plate 66 through the agency of the pins 30 and the barrels 70, tension on the hoist cables 42 being removed on latching between said pins 30 and said barrels 70.

The enlarged nose 46 of the latch pin 30 functions to center the latch pin 30 relative to the latch barrel 70 as said pin 30 enters the barrel 70, thereby preventing misalignment of the latch pin 30 with the latch barrel 70. The provision of the enlarged nose 46 on the pin 30 causes the latch pin 30 to move toward central interior portions of the latch barrel 70 to reduce the potential for jamming of the latch pin 30 with the barrel 70. The enlarged nose 46 of the latch pin 30 prevents the pin extensions 50 from shifting too closely toward inside walls of the latch barrel 70 and thus prevents the pin extensions 50 from entering interior portions of the latch barrel 70 wherein jamming can result.

Figure 9:
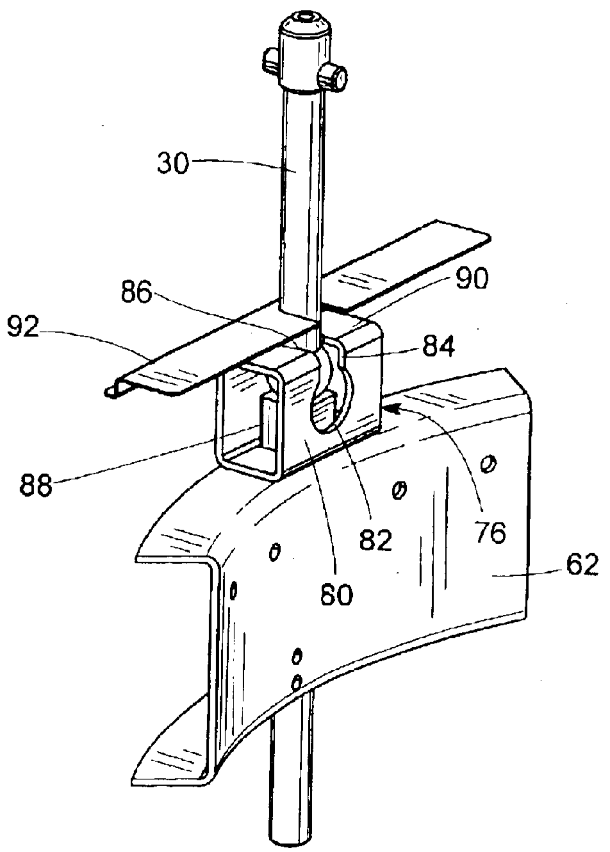

Referring now to FIG. 9, the latch pin 30 is seen to be mounted to the support ring 62 by a latch pin bracket 76 formed essentially of a hollow rectangular solid open at its ends and having a shaped cutout configured as a substantially circular portion 82 and a dimensionally reduced neck portion 84 formed in an inner wall 80. The cutout is configured to have the substantially circular portion 82 dimensioned to receive the ball joint 52 of the latch pin 30 thereto, the dimensionally reduced neck portion 84 of the cutout extending upwardly of the circular portion 82 and terminating in a slot 86 formed in an upper surface of the bracket 76, the slot 86 being dimensioned to receive the body 32 of the latch pin 30 therethrough with a minimum of play between lateral edges of the slot 86 and opposing surfaces of the pin body 32. Once the ball joint 52 of the latch pin 30 is received into the circular portion 82 of the cutout, the latch pin 30 is displaced upwardly relative to the bracket 76 to thereby space the ball joint 52 from lower interior wall surfaces of the bracket 76. A retaining nut 88 is then inserted into the interior of the bracket 76 through an open end thereof and located immediately below the ball joint 52, the nut 88 then being fastened in place by means of fasteners not shown in the drawings. An upper surface 90 of the retaining nut 88 functions as a smooth surface against which the ball joint 52 of the latch pin 30 can rotate during the latching process referred to above relative to FIG. 8. The retaining nut 88 also functions to prevent the ball joint 52 from being displaced downwardly within the bracket 76 and separating from the bracket 76 through displacement of said ball joint 52 through the circular portion 82 of the cutout. The flag 92 is seen in FIG. 9 as well as in FIG. 7 to be mounted to the block 58 and thus is carried by the latch pin 30, the flag 92 functioning as a visual indicator of the position of the latch pin 30 in a manner known in the art.

The latching mechanism of the invention comprised of the improved latch pin 30 functioning in combination with the latch barrel 70 provides substantial operational advantages especially as regards the ability of the ball joint 52 of said latch pin 30 to swivel to thereby allow the support ring 62 to tilt if hung up by inadvertent connection of one of the latch pins 30 to its associated latch barrel 70 during an attempted release of the support ring 62 from the stationary support plate 66 as can occur at the beginning of a lowering procedure. The swiveling movement of the ball joint 52 allows the support ring 62 hung up in this fashion to tilt on the mast 60 without damage to the latch pin 30 or to the support ring 62. Without the ability of the latch pin 30 to swivel as is provided by the ball joint 52, a latch pin can bend and thus be damaged with the result that the support ring 62 will be released from the support plate 66 with increased difficulty and with a subsequent need to replace the bent latch pin.

It is to be understood that a latch pin configured according to the invention can be embodied with either the enlarged nose 46, the ball join 52 or both, and be comprehended by the invention. It is further to be understood that a latch pin configured according to the invention can be embodied other than as expressly shown and described herein, the scope of the invention being defined by the appended claims.

What is claimed is:

1. In a latching mechanism in a hoisting system wherein a support ring is latched to a support plate mounted atop a mast, the support plate having at least one latch barrel having at least one cam carried by said latch barrel, the improvement comprising:

a latch pin carried by the support ring and having pin extensions engageable with the at least one cam of the latch barrel to latch the support ring to the support plate; and, means carried by the latch pin for permitting swiveling movement of the latch pin relative to the support ring.

2. In the latching mechanism of claim 1 and further comprising:

means carried by the latch pin for centering the latch pin in relation to the latch barrel.

3. In the latching mechanism of claim 1 wherein the means comprise a ball joint disposed at one end of the latch pin.

4. In the latching mechanism of claim 3 and further comprising means carried by the support ring for mounting the latch pin to the support ring for swiveling movement relative to the support ring.

5. In the latching mechanism of claim 4 wherein the mounting means comprises a bracket carried by the support ring, the bracket having an opening through which a portion of the latch pin is received with the ball joint being disposed within confines of the bracket, the latching mechanism further comprising means for providing a surface against which the ball joint can rotate.

6. In the latching mechanism of claim 5 and further comprising means for retaining the latch pin in the bracket.

7. In the latching mechanism of claim 6 wherein the retaining means comprises a retaining nut disposed beneath the ball joint, a surface of the nut contiguous with the ball joint comprising the means for providing a surface against which the ball joint can rotate.

8. In the latching mechanism of claim 5 wherein the bracket has a cutout formed in a lateral wall thereof, the cutout being shaped and dimensioned to receive the ball joint therethrough, the cutout having a neck portion communicating the opening with the portion of the cutout receiving the ball joint, the ball joint being insertible into the bracket through the receiving portion of the cutout with body portions of the latch pin being received through the neck portion, the body portion of the latch pin extending through the opening on insertion of the latch pin into the bracket.

9. In the latching mechanism of claim 8 and further comprising means carried by the bracket for maintaining the ball joint in an elevated position within the bracket to prevent the ball joint from dislodgement from the bracket through the receiving portion of the cutout.

10. In the latching mechanism of claim 2 wherein the centering means comprises an enlarged nose portion of the latch pin formed at one end thereof.

11. In the latching mechanism of claim 10 wherein the swiveling means comprises a ball joint disposed at an opposite end of the latch pin from the end thereof having the enlarged nose portion formed thereon.

12. In a latching mechanism in a hoisting system wherein a support ring is latched to a support plate mounted atop a mast, the support plate having at least one latch barrel having at least one cam carried by said latch barrel, the improving comprising:

a latch pin carried by the support ring and having pin extensions engageable with the at least one cam of the latch barrel to latch the support ring to the support plate; and, means carried by the latch pin for centering the latch pin in relation to the latch barrel.

13. In the latching mechanism of claim 12 wherein the centering means comprises an enlarged nose portion of the latch pin formed at an end thereof insertible into the latch barrel.

14. In the latching mechanism of claim 13 and further comprising:

means carried by the latch pin for permitting swiveling movement of the latch pin relative to the support ring.

15. In the latching mechanism of claim 14 wherein the means for permitting swiveling movement of the latch pin comprise a ball joint disposed at an end of the latch pin opposite the enlarged nose portion.

16. In a latching mechanism of a hoisting system wherein a support ring is latched to a support plate mounted atop a mast, the support plate having at least one latch barrel, the improvement comprising a latch pin engageable with the at least one cam to latch the support ring to the support plate, the latch pin comprising:

a body member;

means carried by the body member for engaging the cam to latch the support ring to the support plate; and, means carried by the latch pin for permitting swiveling movement of the latch pin relative to the latch barrel on engagement of the latch pin with the cam.

17. The latch pin of claim 16 wherein the means permitting swiveling movement of the latch pin comprises a ball joint.

18. The latch pin of claim 16 and further comprising means carried by the latch pin for centering the latch pin in relation to the cam.

19. The latch in of claim 18 wherein the centering means comprise an enlarged nose portion of the body member formed at one end thereof, the means for permitting swiveling movement being formed at an opposite end of the body member.

20. The latch pin of claim 19 wherein the means for permitting swiveling movement comprises a ball joint.

21. The latch pin of claim 20 wherein the means for permitting swiveling movement comprises a bracket carried by the first structure, the bracket having an opening through which a portion of the latch pin is received with the ball joint being disposed within confines of the bracket, and further comprising:

means carried by the bracket for providing a surface against which the ball joint can rotate; and, means for retaining the latch pin in the bracket.

22. The latch pin of claim 21 wherein the retaining means comprises a retaining nut disposed beneath the ball joint, a surface of the nut contiguous with the ball joint comprising the means for providing a surface against which the ball joint can rotate.

23. The latch pin of claim 7 and further comprising means carried by the latch pin for centering the latch pin in relation to the latch barrel.

24. The latch pin of claim 23 wherein the centering means comprises an enlarged nose portion of the latch pin formed at one end.

25. The latch pin of claim 7 wherein the bracket has a cutout formed in a lateral wall thereof, the cutout being shaped and dimensioned to receive the ball joint therethrough, the cutout having a neck portion communicating the opening with the portion of the cutout receiving the ball joint, the ball joint being insertible into the bracket through the receiving portion of the cutout with body portions of the latch pin being received through the neck portion, the body portion of the latch pin extending through the opening on insertion of the latch pin into the bracket.

26. The latch pin of claim 24 and further comprising means carried by the bracket for maintaining the ball joint in an elevated position within the bracket to prevent the ball joint from dislodgement from the bracket through the receiving portion of the cutout.

27. In a latching mechanism useful in a hoisting system wherein a support ring is latched to a support plate mounted atop a mast, the support plate having at least one latch barrel having at least one cam carried by said latch barrel, the improvement comprising:

a latch pin carried by the support ring and having pin extensions engageable with the at least one cam of the latch barrel to latch the support ring to the support plate;

means carried by the latch pin for permitting swiveling movement of the latch pin relative to the support ring, wherein the means comprise a ball joint disposed at one end of the latch pin;

means carried by the support ring for mounting the latch pin to the support ring for swiveling movement relative to the support ring, the mounting means comprising a bracket carried by the support ring, the bracket having an opening through which a portion of the latch pin is received with the ball joint being disposed within confines of the bracket, the latching mechanism further comprising means for providing a surface against which the ball joint can rotate; and, means for retaining the latch pin in the bracket, the retaining means comprising a retaining nut disposed beneath the ball joint, a surface of the nut contiguous with the ball joint comprising the means for providing a surface against which the ball joint can rotate.

28. In the latching mechanism of claim 27 wherein the bracket has a cutout formed in a lateral wall thereof, the cutout being shaped and dimensioned to receive the ball joint therethrough, the cutout having a neck portion communicating the opening with the portion of the cutout receiving the ball joint, the ball joint being insertible into the bracket through the receiving portion of the cutout with body portions of the latch pin being received through the neck portion, the body portion of the latch pin extending through the opening on insertion of the latch pin into the bracket.

29. In the latching mechanism of claim 28 and further comprising means carried by the bracket for maintaining the ball joint in an elevated position within the bracket to prevent the ball joint from dislodgement from the bracket through the receiving portion of the cutout.

30. In the latching mechanism of claim 27 and further comprising means carried by the latch pin for centering the latch pin in relation to the latch barrel.

31. In the latching mechanism of claim 27 wherein the centering means comprises an enlarged nose portion of the latch pin formed at one end thereof.

32. In the latching mechanism of claim 27 wherein the swiveling means comprises a ball joint disposed at an opposite end of the latch pin from the end thereof having the enlarge nose portion formed thereon.

* * * * *